S. A. CONRAD.
Hand-Cultivators.
No. 145,153. Patented Dec. 2, 1873.
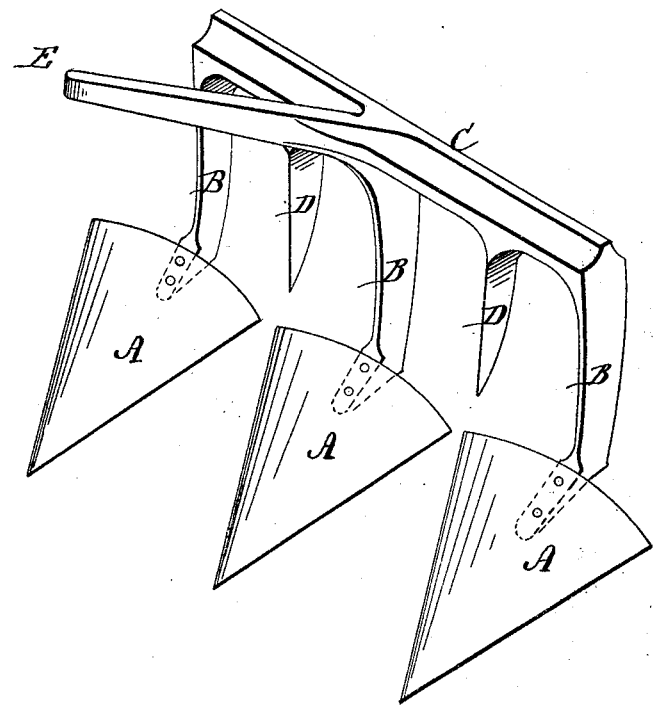
WITNESSES: F. L. Ourand, C. L. Evert.
INVENTOR. Samuel A. Conrad.
By Alexander Mason, Attorneys.

UNITED STATES PATENT OFFICE.

SAMUEL A. CONRAD, OF CENTRALIA, ILLINOIS.

IMPROVEMENT IN HAND-CULTIVATORS.

Specification forming part of Letters Patent No. 145,153, dated December 2, 1873; application filed November 6, 1873.

*To all whom it may concern:*

Be it known that I, SAMUEL A. CONRAD, of Centralia, in the county of Marion and in the State of Illinois, have invented certain new and useful Improvements in Hand-Cultivators; and do hereby declare that the following is a full, clear, and exact description thereof, reference being had to the accompanying drawings and to the letters of reference marked thereon, making a part of this specification.

The nature of my invention consists in the construction and arrangement of a hand-cultivator, as will be hereinafter more fully set forth.

In order to enable others skilled in the art to which my invention appertains to make and use the same, I will now proceed to describe its construction and operation, referring to the annexed drawing, which represents a perspective view of my hand-cultivator.

A A A represent three triangular-shaped teeth, made convex on their upper and concave on their lower sides. These teeth are riveted or otherwise securely attached to shanks B B, which project from a straight bar, C. The bar C is provided with a handle, E, and from the under side of the bar, between the shanks B B, project rake-teeth D D. The bar C with the shanks B B, teeth D D, and handle E may be all made in one piece, of cast or malleable iron; or they may be made separate and firmly united together, as desired, in any suitable manner.

This implement may be used in place of any common hoe for hoeing corn, potatoes, or any other vegetables, as well as for weeding. The hoe-blades or triangular teeth A enter the ground just deep enough to loosen the roots, and the shanks B, in connection with the intermediate teeth D, rake the weeds all out of the ground.

Having thus fully described my invention, what I claim as new, and desire to secure by Letters Patent, is—

The within-described hand-cultivator, consisting of the triangular teeth or blades A, shank B, bar C, and intermediate teeth D, all substantially as and for the purposes herein set forth.

In testimony that I claim the foregoing I have hereunto set my hand this 11th day of October, 1873.

SAMUEL A. CONRAD.

Witnesses:
PETER HOUY,
HIBBARD HALL.